(12) United States Patent
Choi et al.

(10) Patent No.: US 10,495,818 B2
(45) Date of Patent: Dec. 3, 2019

(54) OPTICAL LAYER, DISPLAY DEVICE INCLUDING THE SAME AND BACKLIGHT UNIT

(71) Applicant: Samsung Electronics Co., Ltd., Suwon-si, Gyeonggi-do (KR)

(72) Inventors: Kyuhwan Choi, Yongin-si (KR); Byong Min Kang, Yongin-si (KR); Dong Kyung Nam, Yongin-si (KR); Eunsung Lee, Hwaseong-si (KR); Jinho Lee, Suwon-si (KR); Yoonsun Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 595 days.

(21) Appl. No.: 15/091,064

(22) Filed: Apr. 5, 2016

(65) Prior Publication Data

US 2017/0075055 A1   Mar. 16, 2017

(30) Foreign Application Priority Data

Sep. 11, 2015  (KR) .................. 10-2015-0128814

(51) Int. Cl.
| | |
|---|---|
| *G02B 6/293* | (2006.01) |
| *F21V 8/00* | (2006.01) |
| *G02F 1/1335* | (2006.01) |
| *H04N 13/32* | (2018.01) |
| *H04N 13/31* | (2018.01) |
| *H04N 13/317* | (2018.01) |
| *G02F 1/13* | (2006.01) |

(52) U.S. Cl.
CPC ......... *G02B 6/29304* (2013.01); *G02B 6/005* (2013.01); *G02F 1/133512* (2013.01); *H04N 13/31* (2018.05); *H04N 13/317* (2018.05); *H04N 13/32* (2018.05); *G02F 1/1323* (2013.01); *G02F 2001/133567* (2013.01); *G02F 2001/133626* (2013.01)

(58) Field of Classification Search
CPC ...... G02B 6/005–0055; G02B 6/29304–29329
See application file for complete search history.

(56) References Cited

U.S. PATENT DOCUMENTS

| | | | |
|---|---|---|---|
| 7,317,494 B2 | 1/2008 | Mashitani et al. | |
| 2013/0113785 A1* | 5/2013 | Sumi | H04N 13/31 345/419 |
| 2013/0148045 A1* | 6/2013 | Ohyama | G09G 3/36 349/15 |

FOREIGN PATENT DOCUMENTS

| | | |
|---|---|---|
| JP | 2010-282098 A | 12/2010 |
| JP | 5332978 B2 | 11/2013 |

(Continued)

OTHER PUBLICATIONS

Min et al. "A New Parallax Ellipsoidal Barrier Pattern to Reduce the Cross-Talk Caused by Light Leakage", Opt. Eng. 53(2), 025101 (Feb. 14, 2014). Kyung Hee Univ.

(Continued)

*Primary Examiner* — Sean P Gramling
(74) *Attorney, Agent, or Firm* — Harness, Dickey & Pierce, P.L.C.

(57) ABSTRACT

An optical layer may include a barrier. The barrier may include slits arranged in the barrier so that vertically neighboring slits from among the slits are connected to each other. The slits are configured to transmit light through the barrier.

16 Claims, 7 Drawing Sheets

(56) References Cited

FOREIGN PATENT DOCUMENTS

| JP | 5673008 B2 | 2/2015 |
| KR | 10-2005-0084957 A | 8/2005 |
| KR | 10-2013-0085209 A | 7/2013 |

OTHER PUBLICATIONS

Mashitani et al. "Step barrier system multi-view glass-less 3D display", Proc. of SPIE-IS&T Electronic image, SPIE vol. 5291 (2004), Sanyo Electronic Co., Ltd.

* cited by examiner

200

300

310

320

700

OPTICAL LAYER, DISPLAY DEVICE INCLUDING THE SAME AND BACKLIGHT UNIT

CROSS-REFERENCE TO RELATED APPLICATION

This application claims under 35 U.S.C. § 119 to Korean Patent Application No. 10-2015-0128814, filed on Sep. 11, 2015, in the Korean Intellectual Property Office, the entire contents of which are incorporated herein by reference in its entirety.

BACKGROUND

1. Field

At least one example embodiment relates to an optical layer, a display device including the same, and/or a backlight unit.

2. Description of the Related Art

In general, a three-dimensional (3D) image is configured based on stereo view principles using both eyes of a person. A 3D image display may be a stereoscopic display or an autostereoscopic display. The autostereoscopic display acquires a 3D image by separating an image into a left image and a right image without using glasses, and uses, for example, a parallax barrier method or a lenticular method.

SUMMARY

At least one example embodiment relates to an optical layer.

According to at least one example embodiment, an optical layer includes a barrier. The barrier includes slits configured to transmit light through the barrier, wherein vertically neighboring slits among the slits are connected to each other.

According to at least one example embodiment, the slits are provided in a step structure in which the slits are connected to each other by overlapping a portion of sides of the vertically neighboring slits in a vertical direction or a horizontal direction.

According to at least one example embodiment, a size of the overlapping portion in the step structure is determined based on an angle at which the step structure tilts and a ratio of a slit width to a pixel width of a panel to which the light is transferred when the portion of the sides of the vertically neighboring slits overlaps in the vertical direction or the horizontal direction.

According to at least one example embodiment, the slits are provided regardless of whether the slits are matched to a pixel of a panel to which the light is transferred.

According to at least one example embodiment, sizes of the slits are determined based on a size of a pixel of a panel to which the light is transferred.

According to at least one example embodiment, widths of the slits are set to be narrower than a width of a subpixel included in the pixel based on a pixel width of the panel.

According to at least one example embodiment, heights of the slits are set to be identical to a pixel height of the panel to which the light is transferred or to exceed the pixel height.

According to at least one example embodiment, shapes of the slits are determined based on a shape of a pixel of a panel to which the light is transferred.

At least one example embodiment relates to a display device.

According to at least one example embodiment, a display device includes a backlight unit, an optical layer including slits configured to transmit a light emitted from the backlight unit, and a panel provided a light transmitted from the optical layer to display an image, wherein vertically neighboring slits among the slits are connected to each other.

At least one example embodiment relates to a backlight unit.

According to at least one example embodiment, a backlight unit includes a light source, and a light guide plate including a diffusion pattern to emit a light from the light source to a panel, wherein the diffusion pattern includes pattern elements in which vertically neighboring pattern elements are connected to each other.

According to at least one example embodiment, the pattern elements are provided in a step structure in which the pattern elements are connected to each other by overlapping a portion of sides of the vertically neighboring pattern elements in a vertical direction or a horizontal direction.

According to at least one example embodiment, a size of the overlapping portion in the step structure is determined based on an angle at which the step structure tilts and a ratio of a pattern element width to a pixel width of a panel to which the light is transferred when the portion of the sides of the vertically neighboring pattern elements overlaps in the vertical direction or the horizontal direction.

According to at least one example embodiment, sizes of the pattern elements are determined based on a size of a pixel of the panel.

According to at least one example embodiment, widths of the pattern elements are set to be narrower than a width of a subpixel included in the pixel based on a pixel width of the panel.

According to at least one example embodiment, heights of the pattern elements are set to be identical to a pixel height of the panel or to exceed the pixel height.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
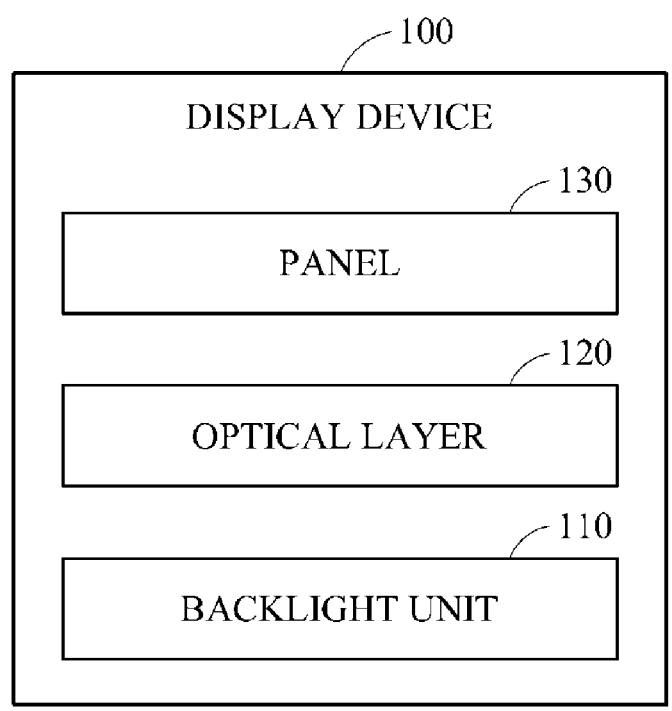
FIG. 1 illustrates an example of a display device according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an example of a display device according to at least one example embodiment.

Referring to FIG. 1, a display device 100 includes a backlight unit 110, an optical layer 120, and a panel 130. The display device 100 refers to a device to display a three-dimensional (3D) image and thus, any type of device configured to display an image by applying a power may be employed as the display device 100. The display device 100 may be implemented in various systems and computing apparatuses, for example, a smartphone, a tablet computer, a laptop computer, a desktop computer, a television (TV), a wearable device, a smart home system, and a digital information display (DID).

The backlight unit 110 refers to an apparatus to provide light to the optical layer 120. For example, the backlight unit 100 may include a light guide plate configured to guide a light source to generate light and the light generated in the light source.

The optical layer 120 may transmit a portion of light emitted from the backlight unit 110 and transfer the portion of the light to the panel 130.

Figure 4:
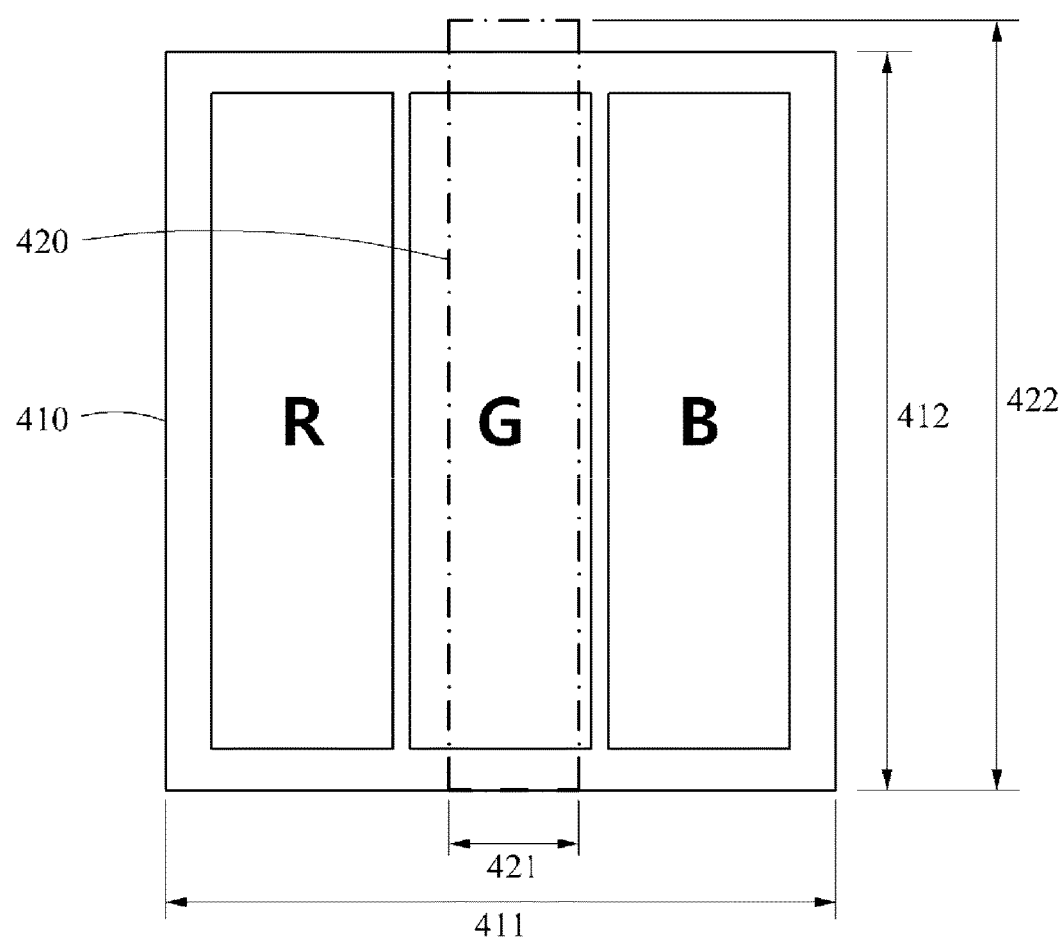
FIG. 4 illustrates an example of a size of a slit including an optical layer according to at least one example embodiment.

The optical layer 120 may include a passive 3D optical element, for example, a parallax barrier, a lenticular lens, and/or a prism sheet, and an active 3D optical element, for example, a liquid crystal barrier and an electro-wetting element. A multi-view 3D scheme may be applied to the optical layer 120 so that slits included in the optical layer 120 are matched to a pixel included in the panel 130. That is, each slit in the optical layer 120 may at least partially align with a single pixel (or subpixel), as shown in FIG. 4. Alternatively, a pixel mismatching scheme may be applied to the optical layer 120 regardless of whether the slits are matched to the pixel. The pixel mismatching scheme may refer to a scheme in which the slits are not matched to the pixel for increasing resolution. A detailed structure of the slits based on the pixel mismatching scheme will be provided with reference to FIG. 5.

Selectively transmitted light in the optical layer 120 may have a property, for example, directivity or a directional nature, of light emitted from a linear light source.

The panel 130 refers to an apparatus to display an image based on an image signal to be input. For example, the panel 130 may include a flat panel display (FPD). Since the panel 130 does not autonomously radiate, the panel 130 may provide the light emitted from the backlight unit 110 through the optical layer 120. The panel 130 may display a 3D image using the provided light. In this example, the light provided from the optical layer 120 may have a property of the light emitted from the linear light source.

Although FIG. 1 illustrates that the display device 100 has an arrangement that is structured in order of the back light unit 110, the optical layer 120, and the panel 130, the display device 100 may have an arrangement that is structured in order of the backlight unit 110, the panel 130, and the optical layer 120. Repeated descriptions will be omitted for increased clarity and conciseness because the descriptions provided with reference to FIGS. 2 through 7 are also applicable to the display device 100 having an arrangement structure in order of the backlight unit 110, the panel 130, and the optical layer 120.

Figure 2:
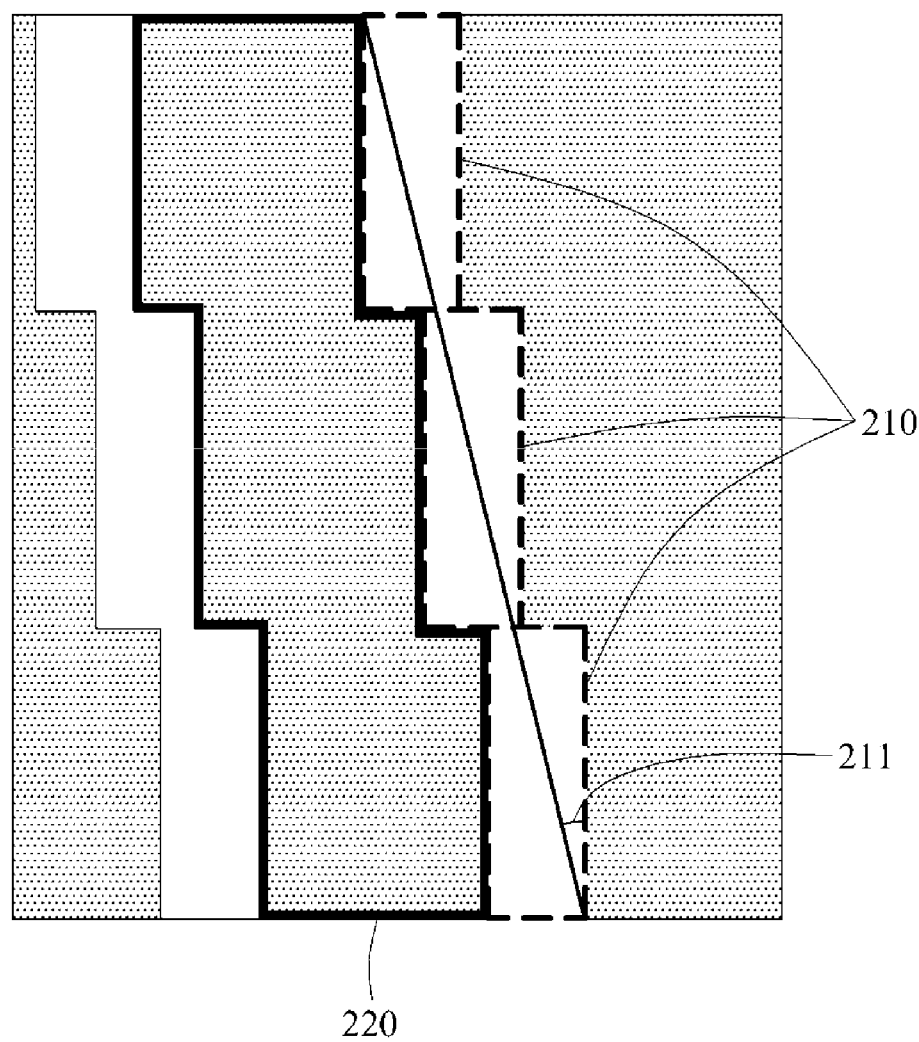
FIG. 2 illustrates an example of an optical layer according to at least one example embodiment.

FIG. 2 illustrates an example of an optical layer according to at least one example embodiment.

Referring to FIG. 2, an optical layer 200 includes slits 210 and a barrier 220.

Slits 210 refer to areas in which light is transmitted, and vertically neighboring slits among the slits 210 may be connected to each other. For example, the slits 210 are provided in a step structure in which the slits 210 are connected to each other by overlapping a portion of sides of the vertically neighboring slits.

A portion of sides of the vertically neighboring slits among the slits 210 illustrated in FIG. 2 may overlap in a horizontal direction so that ends of the slits 210 overlap. A portion of lower sides (or lower ends) of the vertically neighboring slits may overlap with a portion of upper sides (or upper ends) of other slits, so that the slits 210 may be connected to each other based on the step structure.

According to at least one example embodiment, a size of the overlapping portion may be determined based on an angle 211 at which the step structure tilts and a ratio of a slit width to a pixel width. For example, the angle 211 may be 12.5 degrees and may be determined based on a number of viewpoints of a 3D image displayed on a panel. The ratio of the slit width to the pixel width may refer to a ratio with respect to a width of a slit to a width of a pixel included in a panel. For example, a ratio of a slit width to a pixel width may have a range from 20% to 30%.

Sizes of the slits 210 may be determined based on a size of a pixel included in a panel. For example, widths of the slits 210 may be set based on a pixel width of the panel. For example, the widths of the slits 210 may be set to be narrower than a width of a subpixel included in the pixel. In addition, heights of the slits 210 may be set to be identical to a pixel height or to exceed the pixel height.

The slits 210 are provided regardless of whether the slits 210 are matched to the pixel included in the panel. The slits 210 may be provided to be matched to the pixel or provided not to be matched to the pixel. Shapes of the slits 210 are determined based on a shape of the pixel included in the panel. For example, the shapes of the slits 210 may be determined to be identical to the shape of the pixel.

The barrier 220 is provided in a remaining area of the optical layer 200 excluding the slits 210. Light is not transmittable through the barrier 220.

Figure 3:
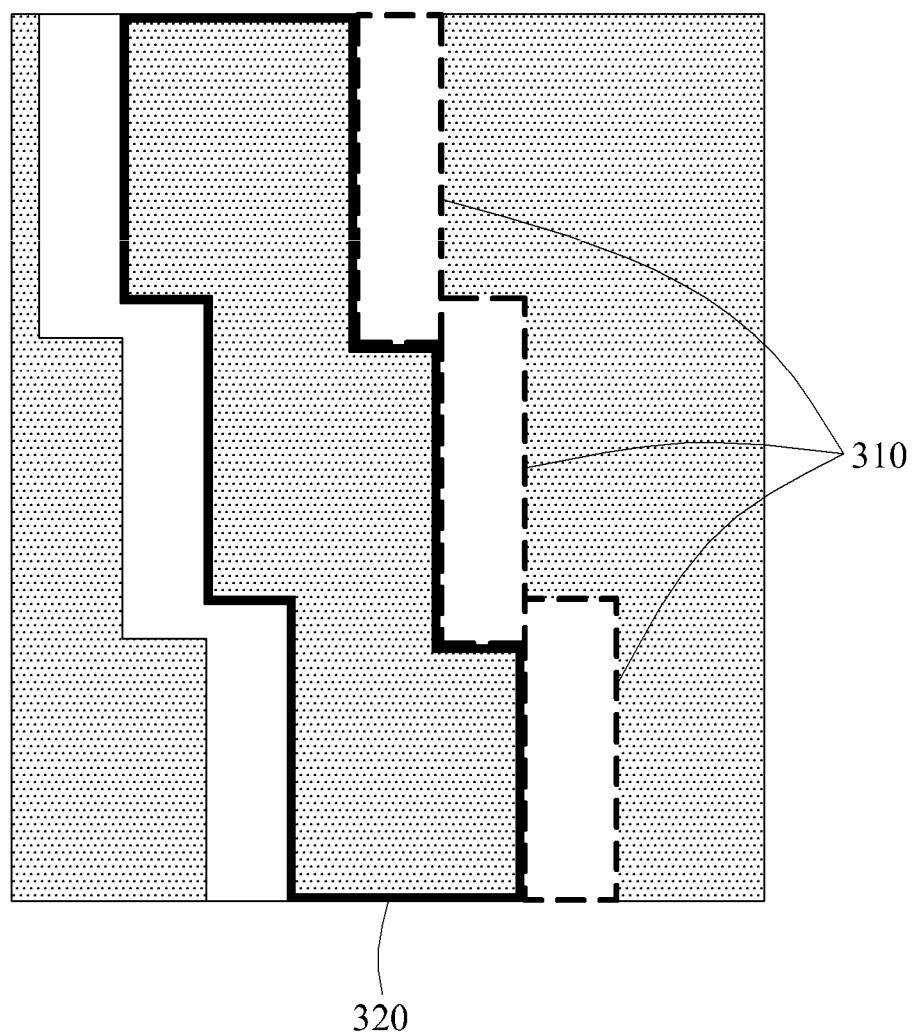
FIG. 3 illustrates another example of an optical layer according to at least one example embodiment.

FIG. 3 illustrates another example of an optical layer according to at least one example embodiment.

Referring to FIG. 3, an optical layer 200 includes slits 310 and a barrier 320.

The slits 310 refer to areas in which light is transmitted, and vertically neighboring slits among the slits 310 may be connected to each other. The slits 310 are provided in a step structure in which the slits 310 are connected to each other by overlapping a portion of sides of the vertically neighboring slits.

A portion of sides of the vertically neighboring slits among the slits 310 illustrated in FIG. 3 may overlap in a vertical direction so that sides of the slits 310 that are adjacent to the ends of the slits 310 overlap. For example, a portion of right sides of the vertically neighboring slits may overlap with a portion of left sides of other slits, so that the slits 310 may be connected to each other based on the step structure.

In this example, a size of the overlapping portion may be set to be less than 30% of a slit height. Concisely, a size of an overlapping portion of a right side of a slit overlapping a left side of another slit may be less than 30% of a slit height.

The barrier 320 is provided in a remaining area of the optical layer 300 excluding the slits 310. Light is not transmittable through the barrier 320.

FIG. 4 illustrates an example of a size of a slit including an optical layer according to at least one example embodiment.

Referring to FIG. 4, a pixel 410 included in a panel and a slit 420 included in an optical layer are illustrated.

The pixel 410 includes a plurality of subpixels, for example, a subpixel R, a subpixel G, and a subpixel B, and a black matrix provided between the subpixels. A size, for example, a width and a height, of the pixel 410 may be determined based on the subpixels and the black matrix.

The slit 420 refers to an area in which light is transmitted from the optical layer. A size of the slit 420 may be determined based on the size of the pixel 410.

A slit width 421 is determined based on a pixel width 411, and the slit width 421 may be determined to be narrower than a width of a subpixel included in the pixel 410. For example, the slit width 421 may be set to be a width from 20% to 30% of the pixel width 411 or a width from 70% to 80% of a width of a subpixel.

A slit height 422 may be determined based on a pixel height 412. For example, the slit height 422 may be set to be identical to the pixel height 412 or to exceed the pixel height 412.

The slit 420 may be provided without an angle of inclination with the pixel 410. Thus, one side of the slit 420 may be provided to be parallel to one side of the pixel 410. The slit 420 and the pixel 410 are provided without an angle of inclination between the slit 420 and the pixel 410, so that light transmitted to the slit 420 may have a property of light passing through a barrier in a vertical shape without an angle of inclination.

Figure 5:
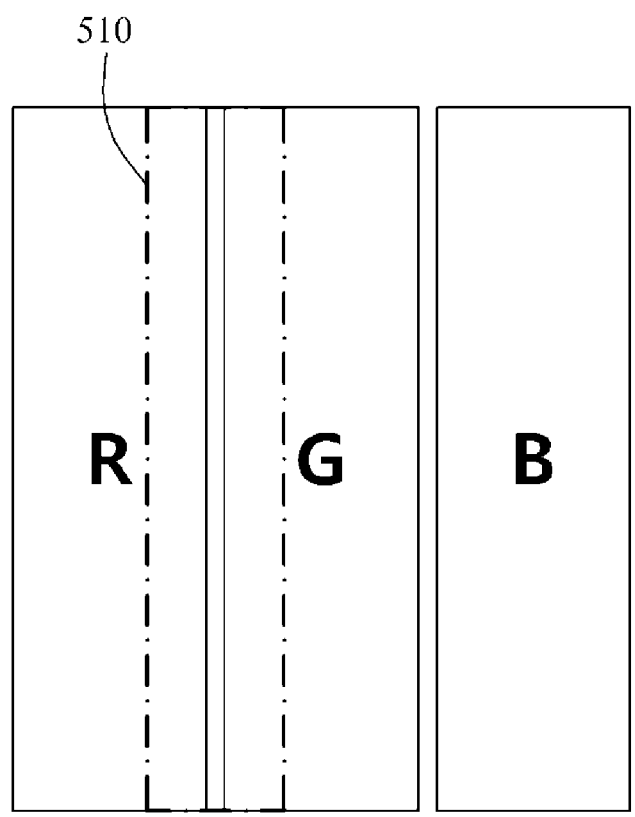
FIG. 5 illustrates an example of a slit provided based on pixel mismatching according to at least one example embodiment.

FIG. 5 illustrates an example of a slit provided based on pixel mismatching according to at least one example embodiment.

Referring to FIG. 5, a slit 510 provided based on mismatching with respect to a pixel included in a panel is illustrated.

The slit 510 is provided regardless of whether the slit 510 is matched to the pixel. Concisely, the slit 510 may be provided to be matched to the pixel, or not to be matched to the pixel. In a display device, a distance between an optical layer and a panel may be a longer distance than a width of the slit 510. For example, the distance between the optical layer and the panel may be designed to be a distance from 1 millimeter (mm) to 4 mm, and a width of the slit 510 may be designed to be a width of approximately 60 Pill. Accordingly, an influence of whether the slit 510 is matched to the pixel may be insignificant or none for displaying a 3D image.

FIG. 5 illustrates an example in which the slit 510 is provided based on mismatching with respect to the pixel. In other words, the slit 510 may be provided by overlapping two subpixels.

Figure 6:
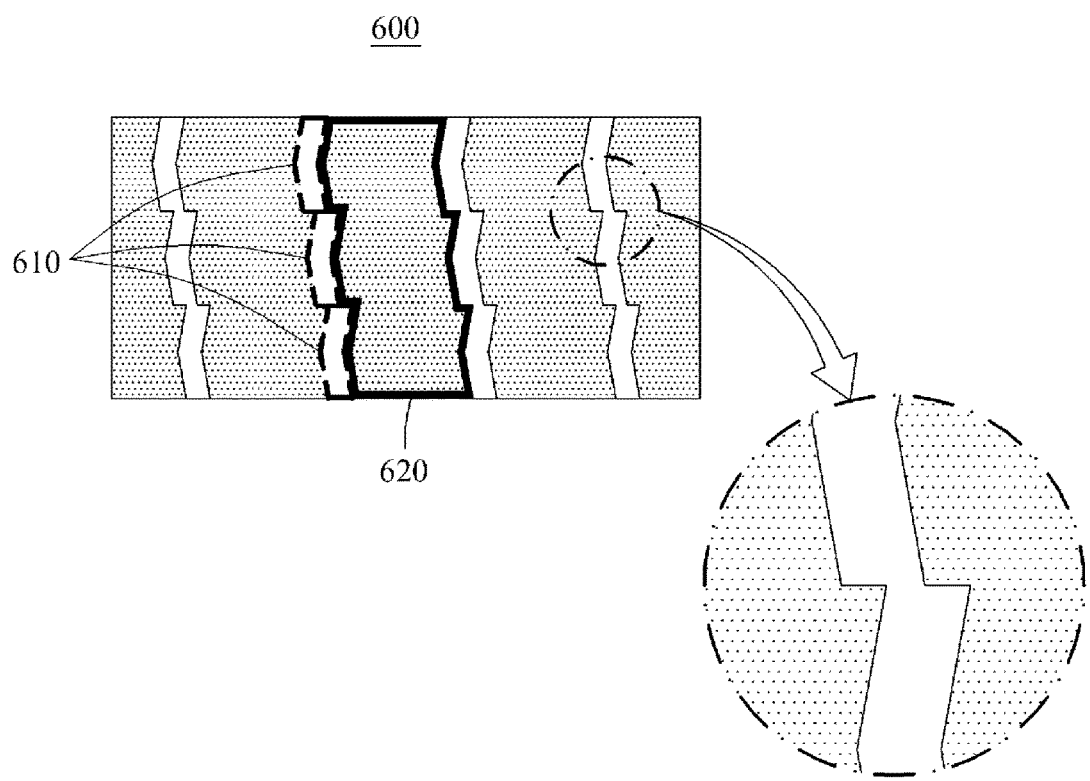
FIG. 6 illustrates a still another example of an optical layer according to at least one example embodiment.

FIG. 6 illustrates a still another example of an optical layer according to at least one example embodiment.

Referring to FIG. 6, an optical layer 600 includes slits 610 and a barrier 620. The slits 610 illustrated in FIG. 6 may have a shape "<" (or zigzag shape) based on shapes of pixels included in a panel.

A pixel included in the panel may have various shapes including a rectangular shape. Since shapes of the slits 610 included in the optical layer 600 are determined based on a shape of the pixel, the slits 610 may also have various shapes including a rectangular shape.

The shapes of the slits 610 illustrated in FIG. 6 may be determined to be identical to the shape "<" of the pixel. Even when the slits 610 have various shapes, vertically neighboring slits among the slits 610 may be provided to be connected to each other. The slits 610 are provided in a step structure in which the slits 610 are connected to each other by overlapping a portion of sides of the vertically neighboring slits. For example, sides of the vertically neighboring slits may overlap in a vertical direction or a horizontal direction.

Figure 7:
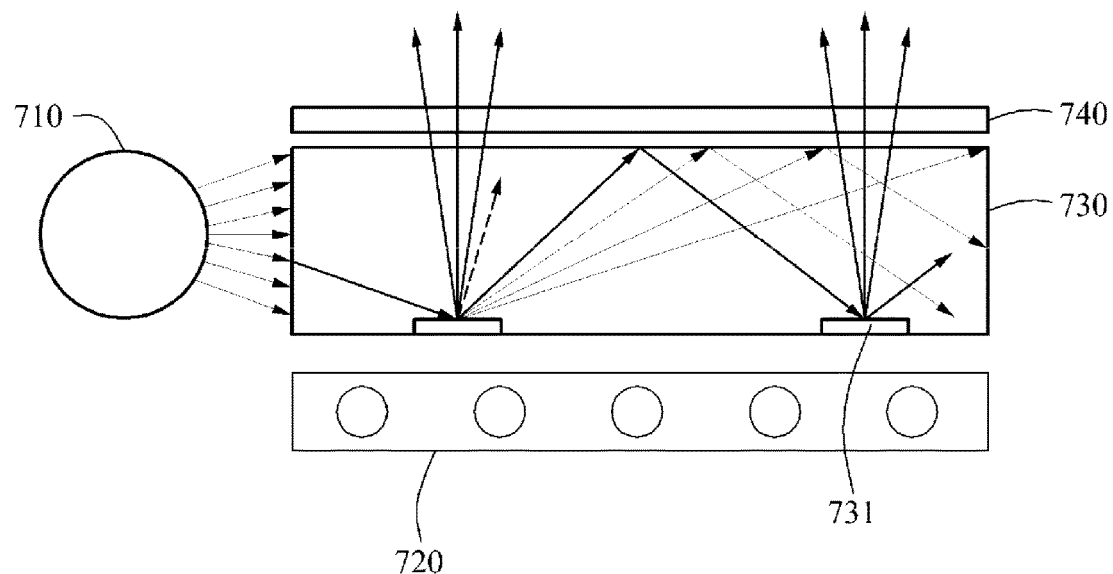
FIG. 7 illustrates another example of a display device according to at least one example embodiment.

FIG. 7 illustrates another example of a display device according to at least one example embodiment.

Referring to FIG. 7, a display device 700 includes a backlight unit and a panel 740. The display device 700 refers to a device to display an image and thus, any type of device configured to display an image by applying a power may be employed as the display device 700. The backlight unit refers to a device including at least one of light sources 710 and 720 and a light guide plate 730. The backlight unit may differ from the backlight unit 110 illustrated in FIG. 1.

The light source 710 may be an edge-type light source 710 and the light source 720 may be a direct-type light source 720. The edge-type light source 710 may be provided at one side of the light guide plate 730. Light emitted from the edge-type light source 710 may be guided from the light guide plate 730 and emitted to the panel 740 by a diffusion pattern 731.

The direct-type light source 720 may be provided at a lower portion of the light guide plate 730. Light emitted from the direct-type light source 720 may be provided to the panel 740 by passing through the light guide plate 730 regardless of the diffusion pattern 731.

For example, when the display device 700 is a device to selectively display a two-dimensional (2D) image and a 3D image, the display device 700 may selectively turn ON any one of the edge-type light source 710 and the direct-type light source 720 according to a type of an image to be displayed. For example, when the image to be displayed is a 3D image, the edge-type light source 710 may be turned ON and the direct-type light source 720 may be turned OFF. Conversely, when the image to be displayed is a 2D image, the edge-type light source 710 may be turned OFF and the direct-type light source 720 may be turned ON.

In another example, the display device 700 may be a device to display a 3D image. In this example, the display device 700 may include the edge-type light source 710 excluding the direct-type light source 720.

The light guide plate 730 may guide light incident from the at least one of the light sources 710 and 720 to the panel 740.

When the light incident is emitted from the edge-type light source 710, the light guide plate 730 may guide the light incident based on a total reflection condition in the light guide plate 730. When the light guided by the light guide plate 730 reaches the diffusion pattern 731 disposed at a lower side of the light guide plate 730, an angle at which the light is processed may be changed. When light of which the process angle is changed does not satisfy the total reflection condition, the light may be emitted to the panel 740. The light emitted from the light guide plate 730 based on the diffusion pattern 731 may have a property, for example, directivity or a directional nature, of light emitted from a linear light source.

The diffusion pattern 731 includes a plurality of pattern elements. Vertically neighboring pattern elements from among the pattern elements may be connected to each other. The pattern elements may be connected to each other by overlapping a portion of sides of the vertically neighboring pattern elements. For example, the portion of sides of the vertically neighboring pattern elements may overlap in a vertical direction or a horizontal direction.

Sizes of the pattern elements are determined based on a size of a pixel included in the panel 740. For example, widths of the pattern elements are determined based on a pixel width. In one example, the widths of the pattern elements may be set to be narrower than a width of a subpixel included in the pixel. In addition, heights of the pattern elements may be set to be identical to a pixel height or to exceed the pixel height.

The pattern elements are provided regardless of whether the pattern elements are matched to the pixel. The pattern elements may be provided to be matched to the pixel or provided not to be matched to the pixel. Also, shapes of the pattern elements may be determined based on a shape of the pixel included in the panel 740. For example, the shapes of the pattern elements may be determined to be identical to the shape of the pixel.

Repeated descriptions will be omitted for increased clarity and conciseness because the descriptions on the slits provided with reference to FIGS. 1 through 6 are also applicable to the pattern elements included in the diffusion pattern 731.

In another example, when the light incident is emitted from the direct-type light source 720, the light guide plate 730 may guide the incident light to the panel 740. The light incident from the direct-type light source 720 may be emitted to the panel 740 regardless of the diffusion pattern 731.

The panel 740 may display a 2D image or a 3D image using light provided from the light guide plate 730. When light generated from the edge-type light source 710 is provided to the panel 740 through the light guide plate 730, the panel 740 may display the 3D image. Conversely, when light generated from the direct-type light source 720 is provided to the panel 740 through the light guide plate 730, the panel 740 may display the 2D image.

According to example embodiments, it is possible to effectively reduce a Moiré phenomenon and crosstalk occurring in a 3D display device by generating a linear light source similar to a square wave using an optical layer having a step structure in which vertically neighboring slits are connected to each other.

Also, according to example embodiments, it is possible to mitigate (or alternatively, prevent) deterioration in image quality of a 2D image displayed on the 3D display device, without providing an optical layer on a front surface of a panel, based on an architecture arrangement structure in order of a backlight unit, an optical layer, and a panel.

Also, according to example embodiments, it is possible to mitigate (or alternatively, prevent) a Moiré phenomenon occurring in a display device by setting a slit width to be narrower than a subpixel width.

Also, according to an example embodiment, it is possible to decrease crosstalk by designing a slit based on a pixel phenomenon.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical layer comprising:
   a barrier including slits arranged in the barrier so that vertically neighboring slits from among the slits are connected to each other, the slits being configured to transmit light through the barrier, wherein the slits have a step structure so that the vertically neighboring slits are connected to each other by an overlapping portion of sides of the vertically neighboring slits in a vertical direction or a horizontal direction, and
   wherein light traveling through the vertically neighboring slits is incident on a pixel of a panel.

2. The optical layer of claim 1, wherein widths of the slits are narrower than a width of a subpixel comprised in a pixel of the panel to which the light is transferred.

3. The optical layer of claim 1, wherein a size of the overlapping portion in the step structure is based on an angle at which the step structure tilts and a ratio of a slit width to a pixel width of a pixel of the panel to which the light is transferred.

4. The optical layer of claim 1, wherein the slits are not matched to a pixel of the panel to which the light is transferred.

5. The optical layer of claim 1, wherein sizes of the slits are based on a size of a pixel of the panel to which the light is transferred.

6. The optical layer of claim 5, wherein widths of the slits are 70% of a width of a subpixel comprised in the pixel.

7. The optical layer of claim 5, wherein heights of the slits are identical to or exceed a pixel height of the pixel.

8. The optical layer of claim 1, wherein shapes of the slits are based on a shape of a pixel of the panel to which the light is transferred.

9. The optical layer of claim 3, wherein the ratio of a slit width to a pixel width of a pixel of the panel to which the light is transferred is between 20 percent and 30 percent.

10. A display device comprising:
    a backlight unit configured to emit light;
    an optical layer comprising slits, the slits being configured to transmit the light emitted from the backlight unit, vertically neighboring slits from among the slits being connected to each other; and
    a panel configured to receive light transmitted from the optical layer to display an image,
    wherein the slits have a step structure so that the vertically neighboring slits are connected to each other by an overlapping portion of sides of the vertically neighboring slits in a vertical direction or a horizontal direction, and
    wherein light traveling through the vertically neighboring slits is incident on a pixel of the panel.

11. The display device of claim 10, wherein widths of the slits are narrower than a width of a subpixel comprised in a pixel of a panel to which the light is transferred.

12. The display device of claim 10, wherein a size of the overlapping portion in the step structure is based on an angle at which the step structure tilts and a ratio of a slit width to a pixel width of a pixel of the panel to which the light is transferred.

13. The display device of claim 10, wherein sizes of the slits are based on a size of a pixel of the panel.

14. The display device of claim 13, wherein widths of the slits are 70% of the width of a subpixel comprised in the pixel.

15. The display device of claim 13, wherein heights of the slits are identical to or exceed a pixel height of a pixel in the panel.

16. The display device of claim 12, wherein the ratio of a slit width to a pixel width of a pixel of the panel to which the light is transferred is between 20 percent and 30 percent.

* * * * *